Feb. 13, 1968   G. W. LAKE   3,369,166

COMBINATION TRANSFORMER-RECTIFIER APPARATUS

Filed Oct. 22, 1965

WITNESSES:
John L. Chopp
James F. Young

INVENTOR
Glen W. Lake

BY F. E. Browder
ATTORNEY

United States Patent Office 3,369,166
Patented Feb. 13, 1968

3,369,166
COMBINATION TRANSFORMER-RECTIFIER
APPARATUS
Glen W. Lake, Brookfield, Ohio, assignor to Westinghouse Electric Corporation, Pittsburgh, Pa., a corporation of Pennsylvania
Filed Oct. 22, 1965, Ser. No. 501,179
6 Claims. (Cl. 321—8)

This invention relates to static electrical apparatus, and more particularly to a transformer-rectifier combination.

In the prior art transformer-rectifier combinations, it has been the practice to provide a tank for housing a transformer and a rectifier. This tank is usually filled with a dielectric fluid which at least covers the transformer and the rectifier apparatus. Alternating current is supplied to the input of the transformer and the output from the transformer is usually rectified by the rectifier apparatus for use by some load which requires direct current power. This arrangement required separate bushings for bringing the alternating current input into the tank and also a set of bushings for taking the direct current output from the rectifier out of the tank to make it available to the load. This arrangement also required a large tank in order to accommodate both the transformer and the rectifier. With this arrangement whenever it became necessary to service the rectifier, the tank had to be opened and the dielectric fluid removed in order to gain access to the rectifier apparatus. This also causes contamination of the fluid dielectric.

It is an object of this invention to provide transformer-rectifier apparatus wherein the transformer is housed in a casing and the rectifier apparatus is contained in the bushings used for taking the output from the transformer through the transformer wall to a load.

It is also an object of this invention to provide improved transformer-rectifier apparatus.

It is a further object to provide improved transfomer-rectifier apparatus which requires a smaller tank for housing the apparatus than prior art transformer-rectifier apparatus.

It is a still further object of this invention to provide improved transformer-rectifier apparatus wherein the rectifier apparatus may be serviced without removing or contaminating the fluid dielectric in the tank.

These and other objects are affected by this invention as will be apparent by the following description taken in accordance with the accompanying drawings, forming a part of this application, in which.

Like reference characters will be used throughout to indicate like parts in the various figures.

Figure 1:
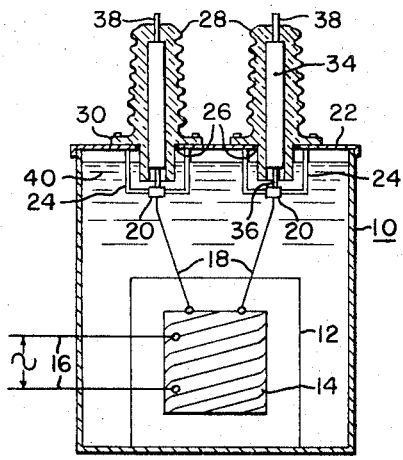
FIGURE 1 is a partial sectional, and partial schematic mounted view, illustrating the transformer-rectifier arrangement of this invention in a single phase system.

Referring to the drawings in detail, in FIG. 1 is shown a transformer casing 10 having a single phase transformer comprising a magnetic core 12 having a coil 14 inductively associated therewith mounted in the casing 10. The casing 10 is filled with a dielectric fluid such as oil or some other fluid which completely submerges the core 12 and the coil 14. An alternating current supply is attached to the coil 14 by means of conductors 16. The conductors 16 are shown schematically, however, it is understood that suitable bushings would be provided for bringing the conductors 16 through the wall of the casing 10. An alternating output is obtained from the coil 14 by means of the conductors 18. The conductors 18 are attached to hollow connector elements 20.

The hollow connector elements 20 are supported from the underside of the top wall 22 of the tank 10 by means of brackets 24 which may be welded or attached in any suitable manner to the underside of a top wall 22 of the tank 10. The top wall 22 of the tank 10 is provided with a pair of openings 26 for receiving output bushings 28. Each of the output bushings 28 is provided with a flange portion 30 which has bolt holes therein for receiving bolts which are attached to the upper wall 22 of the tank 10. A gasket is provided between the bushings 28 and the upper wall 22 of the tank 10 whereby when the bolts 30 are tightened the bushings 28 are attached to the upper wall 22 of the tank 10 with an airtight connection.

Each of the bushings 28 is hollow and has assembled therein a rectifier assembly 34. The rectifier assembly has extending from the lower end thereof a plug connector 36 which fits into the hollow connector 20 to make good electrical connection between the leads 18 and the rectifier assembly 34. A conductor 38 extends through the upper end of each of the bushings 28 and is connected to the rectifier assembly 34. The conductors 38 provide means for connecting a load to the output of the rectifiers 34. The arrangement illustrated in FIG. 1 is a schematic arrangement for a single phase transformer-rectifier apparatus.

It is noted in FIG. 1 that the dielectric material indicated by the dash lines 40, completely covers the core 14 and coil 12 assembly and extends upwardly in the tank to seal the lower ends of the hollow bushings 28 so that air or other contaminates cannot collect in the hollow bushings 28 around the rectifier assemblies 34. The output from the rectifier assemblies 34 may be connected in any desired single phase arrangement.

Figure 2:
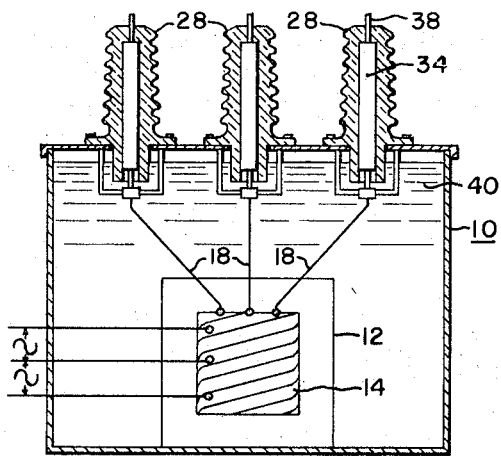
FIG. 2 is a partial schematic, and partial sectional view, illustrating a transformer-rectifier arrangement provided by this invention in a multiphase system.
Figure 3:
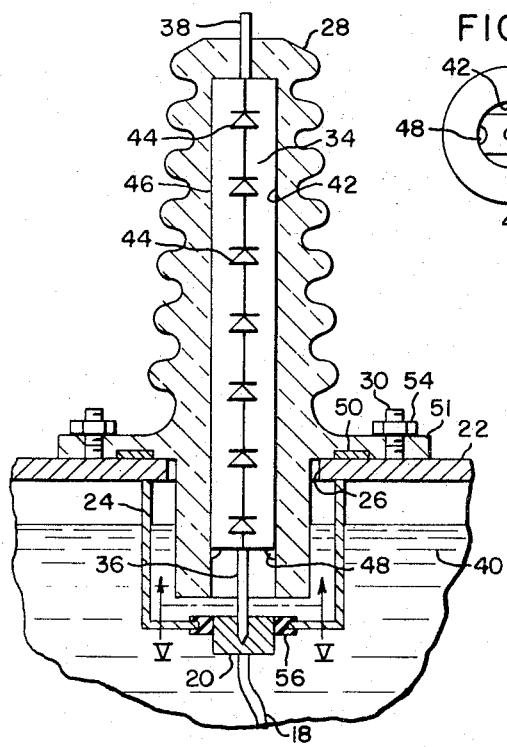
FIG. 3 is a partial sectional detail of the rectifier arrangement provided by this invention.

FIG. 2 schematically illustrates a rectifier-transformer arrangement as provided by this invention for multiphase operation. For convenience of illustration, FIG. 3 shows an arrangement for three phase operation. However, it is understood that this invention may be used to provide any of the well known multiple phase rectified outputs. Any of the well known rectifier circuit arrangements may be provided by providing a bushing 28 containing a rectifier assembly 34 for each leg of the rectifier circuit. In the arrangement shown in FIG. 2, like reference characters indicate like elements in FIG. 1.

FIG. 3 is an enlarged detail of a bushing 28 including a rectifier assembly 34 which may be used in the apparatus illustrated in FIGS. 1 and 2. The bushing 28 is made of porcelain, glass or some suitable molded plastic materials. The bushing 28 has a hollow opening 42 therein. The hollow 42 is open at the lower end of the bushing but is closed at the upper end by the bushing material, except for the electrical conductor 38 which is molded through the upper end of the bushing.

A rectifier assembly 34 is mounted in the hollow 42 of the bushing 28. This rectifier assembly 34 comprises a plurality of rectifying devices, such as silicon, or germanium diodes, or selenium rectifiers 44. The devices 44 are mounted on a rack or tray 46 and may be connected in any desired series and/or parallel circuit configuration on the rack or tray 46. The rack or tray 46 is inserted into the opening 42 in the bushing 28 and connection is made between the upper rectifying element 44 and the conductor 38. The lower end of the opening 42 in the bushing may be provided with lugs 48 for holding the tray or rack 46 in the hollow opening 42 in the bushing 48. The lower rectifying element 44 on the rack or tray 46 is electrically connected to a plug connector 36. When the bushing 28 is placed in the opening 26 in the upper tank wall 22 of the tank 10, the plug connector 36 is inserted into the hollow connector 20 to make electrical connection between the output lead 18 of the transformer and the rectifier assembly 34. The gasket 50 is provided between a flange 51 of the bushing 28 and the tank wall 22 so that when nuts 54 are tightened onto the bolts 30 the flange 51 makes a fluid tight connection with the upper tank wall 22.

The brackets 24 which support the hollow conductor members 20 are welded or attached in some other suitable manner to the underside of the wall 22 of the tank 10. An insulating member 56 insulates the connector member 20 from the bracket members 24. In the embodiment illustrated in FIG. 3, the fluid dielectric 40 has sufficient height in the tank 10 to cover the lower open end of the bushing 28 to prevent air or other contaminates from entering the hollow 42 and contaminating the rectifier elements 44. However, if desired, after the rectifier assembly containing the rectifying elements 44 has been positioned in the opening 42 in the bushings 28, resin material, such as an epoxy or polyester resin, may be poured into the hollow 42 in the bushings 28 to completely encapsulate the rectifier assembly 34 in the bushing 28 and make the rectifier assembly 34 in the bushing 28 a unitary structure that may be attached or detached from the transformer casing 10 as a single element or the bushing 28 may be molded directly around the rectifier assembly 34. The arrangement shown in FIG. 3 provides a rectifier assembly which may be easily attached to a transformer casing with a plug-in connection to provide a rectified direct current output from the transformer. The assembly may not only be easily installed on the transformer, but it requires less space than prior art devices since it occupies very little transformer casing space, requires no transformer oil or other dielectric for cooling of the rectifier device and it may be easily removed from the transformer casing for servicing and reinstalled without having to remove the fluid dielectric from the transformer casing or without contaminating the fluid dielectric in the transformer casing. In this arrangement any leg of the rectifier may be replaced by simply replacing a bushing 28 containing a rectifier assembly 34.

Figure 4:
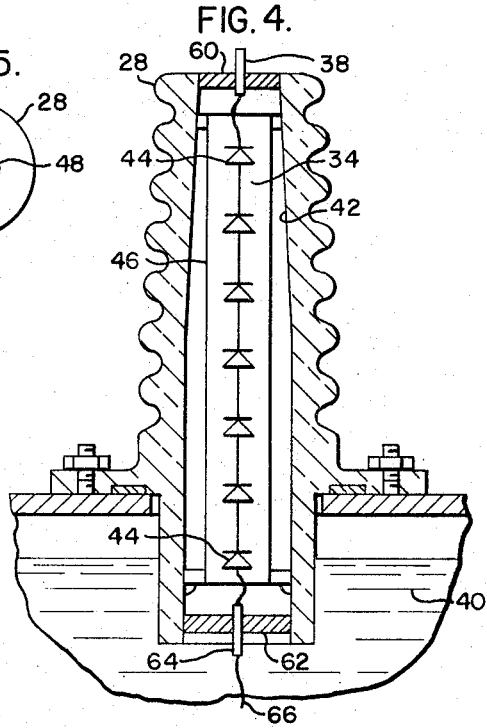
FIG. 4 is a partial sectional detail of a second embodiment of the rectifier ararngement provided by this invention.

FIG. 4 illustrates a second embodiment of a rectifier and bushing arrangement as disclosed by this invention. This embodiment is similar to the embodiment illustrated in FIG. 3 except that the upper and lower ends of the bushing 28 are closed with closure members 60 and 62. In this embodiment, if desired, after the rectifier assembly 34 has been positioned in the hollow opening 42 in the bushing, the rest of the space in the hollow opening 42 is completely filled with a suitable fluid dielectric and the hollow opening 42 is hermetically sealed by the closures 60 and 62. An electrical conductor 38 extends from the upper end of the bushing and is electrically connected to the uppermost rectifying device 44 and a similar electrical conductor 64 extends through the lower closure member 62 and is electrically connected to the lowermost rectifying device 44. The conductor 64 may be attached to the transformer leads 18 by means of a plug-in type of connector, such as 36, illustrated in FIGS. 1, 2 and 3, or by a flexible lead, such as 66. In all other respects, the embodiment shown in FIG. 4 is installed identically and operates identically as the embodiment of the invention shown and described in FIGS. 1, 2 and 3.

Figure 5:
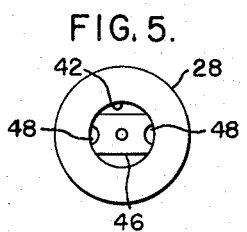
FIG. 5 is a sectional view taken along the lines V—V of FIG. 3.

FIG. 5 is a sectional view taken along lines V—V of FIG. 3. This view shows the bushing 28 having a hollow opening 42 therein with the rectifier tray 46 in position and also illustrates how the lugs 48 engage the lower end of the rectifier tray 46 to hold the tray in assembled position in the hollow opening 42 in the bushing 28.

From the foregoing description, it is seen that this invention has provided a smaller, more compact transformer-rectifier assembly than the prior art devices which require no more tank space than a standard liquid or fluid immersed rectifier transformer. This means that the transformer-rectifier assembly is much lighter than the prior art devices and will require less insulating and cooling fluid dielectrics than the prior art devices, and, furthermore, the rectifier assemblies may be installed much easier than it would require to install a rectifier unit which is mounted in the same casing and cooled with the same fluid dielectric as the transformer. Also, with the transformer-rectifier assembly provided by this invention, any leg of the rectifier output circuit may be replaced without disturbing other legs of the rectifier merely by removing the bushing containing the defective rectifier leg and installing a bushing containing a good rectifier leg.

It is to be understood that the invention provided by this invention may be used to provide any of the well known single phase or multiphase rectified output circuits. It is to be understood that a bushing and rectifier assembly would have to be provided for each leg of the rectifier circuit. This invention may be used to provide either single phase rectified DC output circuits or any of a well known multiphase DC direct current output circuits.

From the foregoing, it is seen that this invention has provided efficient and economical transformer-rectifier equipment which has many advantages over the prior art transformer-rectifier equipments.

While the invention has been shown in several forms, it will be obvious to those skilled in the art that it is not so limited, but is susceptible of various changes and modifications without departing from the spirit thereof.

I claim as my invention:

1. In combination, a tank, a transformer comprising a core and coil assembly in said tank, fluid dielectric surrounding said core and coil assembly, circuit means for connecting an alternating current power source to said coil, circuit means for connecting a load to said coil, a bushing attached to and extending into said tank, rectifying means mounted in said bushing, said rectifying means connected in circuit relationship with said circuit means for connecting a load to said coil for converting the current delivered to a load from alternating to direct current.

2. In combination, a tank, a transformer comprising a core and coil assembly in said tank, fluid dielectric surrounding said core and coil assembly, circuit means for connecting an alternating current power source to said coil, circuit means for connecting a load to said coil, a female contact element connected to said circuit means for connecting a load to said coil, a hollow bushing extending through said tank and connected to said tank, rectifying means mounted in said hollow bushing, a male connector attached to said rectifying means and engaging said female connector means, and means extending from said hollow bushings for connecting a load to said rectifying means.

3. In combination, a tank, a transformer comprising a core and coil assembly in said tank, fluid dielectric surrounding said core and coil assembly, circuit means for connecting an alternating power source to said coil, circuit means for connecting a load to said coil, a hollow connector member attached to said means for connecting a load to said coil, a hollow bushing attached to said tank and having its lower end extending into said tank, the upper end of said hollow bushing being closed, the lower end of said hollow bushing being closed to atmosphere by the fluid dielectric in said tank, rectifying means mounted in said hollow bushing, said rectifying means being connected by means of a plug-in connector to said hollow connector member, circuit means extending through the closed upper end of said bushing for connecting a load to said rectifying means.

4. In combination, a tank, a transformer comprising a core and coil assembly in said tank, fluid dielectric surrounding said core and coil assembly, first circuit means for connecting an alternating current power source to said coil, second circuit means for connecting a load to said coil, said second circuit means being connected to a hollow connector element, a hollow bushing attached to said tank and extending into said tank, rectifying means mounted in said hollow bushing, said bushing being filled with fluid dielectric and sealed to the atmosphere, a plug extending from the lower end of said bushing and making an electrical connection with said hollow plug connector element, and circuit means extending from the upper end of said bushings for connecting a load to said rectifying means.

5. In combination, a tank, a transformer comprising a core and coil assembly in said tank, fluid dielectric surrounding said core and coil assembly, circuit means for connecting an alternating current power source to said coil, circuit means for connecting a load circuit to said coil, a plurality of hollow bushings removably mounted on said tank and extending into said tank, rectifying means mounted in said hollow bushings, said circuit means for connecting a load to said coil being attached to a hollow connector member, a plug connector member connected to said rectifying means and extending from the lower ends of each of said bushings and connecting with said hollow plug connectors, and circuit means extending from the upper ends of said bushings for connecting a load to said rectifying means.

6. In combination, a tank, a transformer comprising a core and coil assembly in said tank, fluid dielectric surrounding said core and coil assembly, circuit means for connecting an alternating current power source to said coil, circuit means for connecting a load to said coil, said circuit for connecting a load to said coil being connected to a hollow connector member, a plurality of hollow bushings removably mounted on said tank and extending into said tank, removable rectifier assemblies in each of said bushings, a plug connector connected to each of said rectifier assemblies and plugged into said hollow connector member, and circuit means extending through the upper ends of said bushings for connecting a load to said rectifier assemblies.

References Cited

UNITED STATES PATENTS

| 2,780,757 | 2/1957 | Thornhill et al. | 317—234 |
| 3,193,754 | 7/1965 | Dortort | 321—27 |

FOREIGN PATENTS

| 522,022 | 8/1953 | Belgium. |

JOHN F. COUCH, *Primary Examiner.*

W. H. BEHA, *Assistant Examiner.*